Aug. 28, 1934. R. D. BOOTH ET AL 1,971,518
METHOD AND APPARATUS FOR EXPANDING HIGH PRESSURE GAS
Filed Sept. 8, 1932
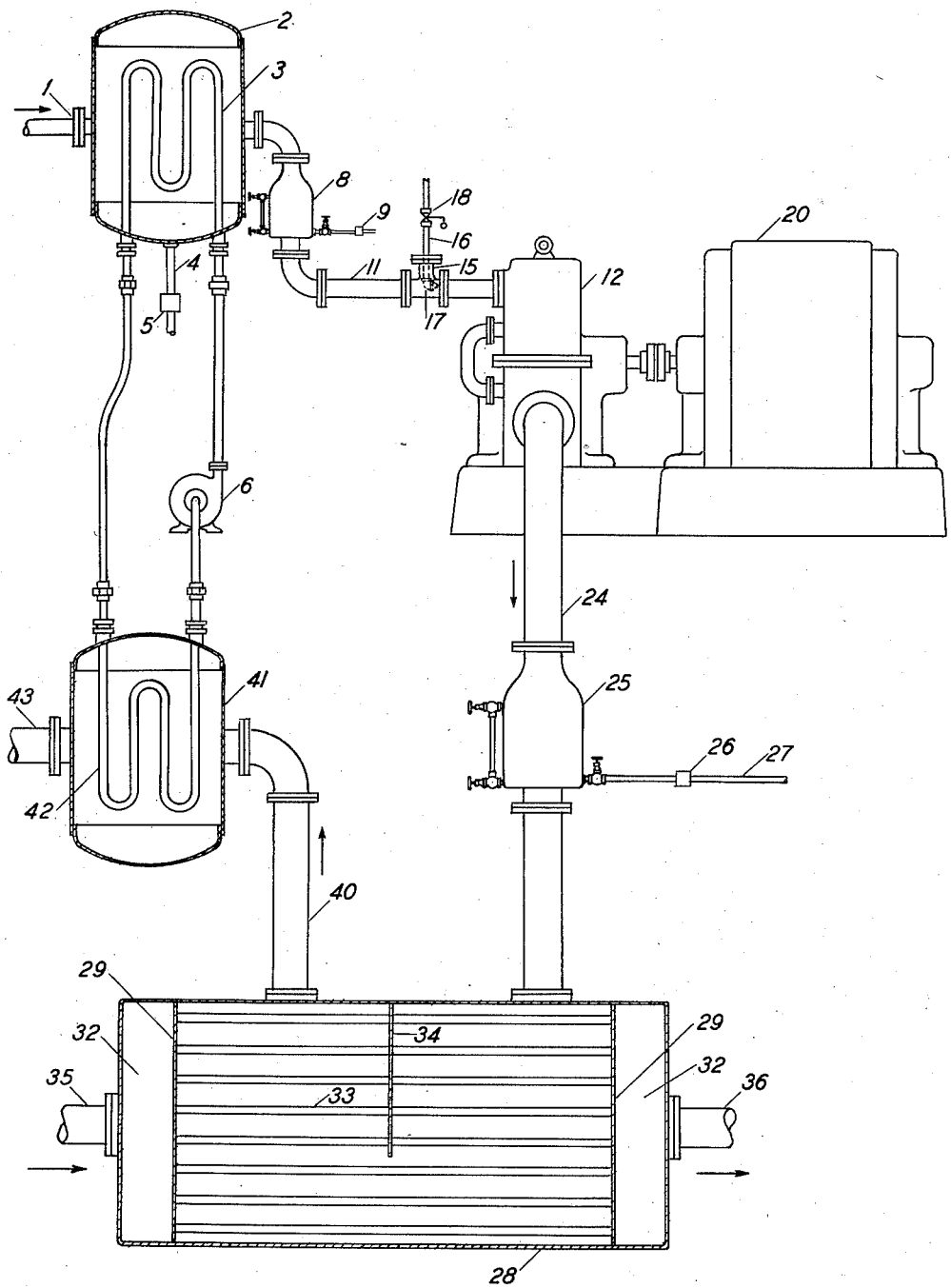
Ralph D. Booth
John R. Coffin
and Alexander J. Figges
INVENTORS
BY W. E. Currie
ATTORNEY Patented Aug. 28, 1934

1,971,518

UNITED STATES PATENT OFFICE 1,971,518

METHOD AND APPARATUS FOR EXPANDING HIGH PRESSURE GAS

Ralph D. Booth, Brookline, John R. Coffin, Newton Highlands, and Alexander J. Tigges, Boston, Mass., assignors of one-half to Jackson & Moreland, a partnership and one-half to Standard Oil Development Company, a corporation of Delaware Application September 8, 1932, Serial No. 632,141

1 Claim. (Cl. 62—136)

This invention relates to the use of anti-freeze substances to prevent difficulties from frost formation in the expansion of a gas to secure power and refrigeration.

It is recognized that the expansion of gas has long been used as a means of obtaining power and refrigeration. However, in all methods which have been utilized heretofore, it has not been possible to avoid trouble from frost formation and at the same time secure temperatures sufficiently low to be of general refrigerating value unless the gas available has been extremely dry. In general, if the gas contains any appreciable quantity of water vapor such expansion results in the precipitation of part of this water vapor as a fine snow, ice or frost which collects in the power apparatus and interferes with the satisfactory mechanical operation thereof.

The present application discloses a method whereby the precipitation of the moisture present in the gas can be made to occur in a liquid rather than a solid form. In the liquid form the precipitated moisture will not interfere with the operation of a turbine or other power producing apparatus but will be swept out of the turbine with the exhaust gas. This object is attained by injecting into the high pressure gas prior to expansion a substance which, mixing with the moisture precipitated from the gas during expansion, will form a solution or mixture having a freezing point lower than that of water itself. There are, of course, numerous substances which have this property of which alcohol, glycerine and sodium chloride may be mentioned. Means are also provided for recovering from the exhaust gas the anti-freeze substance along with the water and any other substances which may have been precipitated from the gas and for utilizing the low temperature of the expanded gas for refrigeration.

In connection with this process it is sometimes advantageous to precool the high pressure gas before expansion. By this process a lower minimum temperature for refrigeration can be obtained. Also, the precipitation and removal of moisture during precooling will reduce the amount of moisture precipitated during expansion and therefore a smaller amount of anti-freeze substance will be required to produce a mixture of a given concentration. A further advantage is that the lower the temperature at the recovery apparatus the more complete is the recovery of the volatile substances which may be present in the gas including the anti-freeze substance, if volatile. On the other hand, precooling the gas may in certain cases result in an exhaust temperature so low as to cause difficulty in maintaining the precipitated moisture in a liquid form even with the use of the anti-freeze substance. For this reason the advisability of precooling and the amount of precooling desirable will depend upon the circumstances of each case. The precooling equipment utilizes the cold exhaust gas as a precooling means. Of course, if more convenient, any other precooling means can be used for this purpose.

In the attached drawing the figure is a diagrammatic showing of a preferred form of apparatus for carrying out the invention.

Referring to the drawing high pressure gas is conveyed by a supply pipe 1 to a gas precooling chamber 2 containing a pipe coil 3 and fitted with a drain 4 controlled by a trap 5. Cold brine is circulated in the pipe coil 3 by a pump 6. The gas passing through chamber 2 is cooled by contact with the pipe coil 3 and a portion of the water vapor and other condensible vapors contained therein is precipitated and removed by the drain 4 and trap 5.

The gas passes from the precooling chamber 2 to a moisture separator 8. This moisture separator may be any one of a number of types commonly used. Its function is to remove and eliminate through a trap 9 any precipitated moisture which has been swept through the precooling chamber 2. From the moisture separator 8 the high pressure gas is conveyed by a pipe 11 to a turbine 12. Ordinarily there would be provided a shut-off valve not shown in the supply pipe 1 and a suitable governing mechanism not shown controlling the admission of gas to the turbine 12. We have not shown the valve and governor mechanism as various types of equipment are available for these purposes and are sufficiently familiar to the industry as to require no description here.

In the pipe 11 there is provided a means of injecting an anti-freeze substance into the high pressure gas prior to its expansion in the turbine 12. As noted above, this may be any substance capable of forming with water a mixture or solution having a freezing point lower than that of water itself. Alcohol is particularly satisfactory for the purpose since its aqueous solutions are relatively stable and in proper concentrations have very low freezing points. Alcohol has the further advantage that it is readily vaporized and therefore during the subsequent simultaneous precipitation of alcohol and water the two liquids are intimately mixed at the instant of precipitation. For convenience we have indicated a very simple method of injecting the anti-freeze substance. A T 15 inserted in the pipe 11 admits a small pipe 16 terminating within the pipe 11 in a nozzle 17. The anti-freeze substance supplied at suitable pressure by a pump (not shown) is conveyed by the pipe 16 to the nozzle 17 from which it is sprayed into the stream of high pressure gas. The rate of supply of anti-freeze substance may be controlled manually or may be proportioned to the rate of gas flow by use of a familiar carburetor principle or by use of a valve interconnected with the turbine governing mechanism or by use of a valve actuated by suitable apparatus in response to the concentration of anti-freeze substance in the liquid precipitated during expansion. A regulator 18 in the pipe 16 designates in general the apparatus required for application of any of these methods. It is essential only that the anti-freeze substance in sufficient quantity be mixed with the gas before the expansion within the turbine takes place. The high pressure gas containing a suitable proportion of the anti-freeze substance expands in the turbine 12 driving the turbine which furnishes power as, for example, to an electric generator shown at 20. As a result of this expansion the temperature of the gas is reduced and water vapor is precipitated therefrom. This precipitated water vapor mixing with the anti-freeze substance forms a liquid with a low freezing point and by suitably proportioning the quantity of anti-freeze substance to the amount of moisture vapor in the high pressure gas freezing of the precipitated moisture can thereby be prevented down to very low temperatures.

After expansion in the turbine 12 the gas is conveyed by a turbine exhaust pipe 24 to a moisture separator 25. This moisture separator may be any one of several types in common use. Its function is to collect and remove the liquid which has been precipitated during the expansion in the turbine. This liquid, consisting of the precipitated water, the anti-freeze substance and in some cases containing other substances which have been precipitated from the gas during the process of expansion, is removed from the exhaust gas in the moisture separator 25, ejected through a trap 26 and conveyed by a pipe 27 to a suitable apparatus where it may be distilled or subjected to other suitable processes for the recovery of the anti-freeze substance and any other valuable substances which may have been precipitated during the expansion of the gas. If the anti-freeze substance and the other substances are not sufficiently valuable to warrant the expense of such treatment, this precipitate may be discarded, or the moisture separator 25 may be omitted. The recovery processes are processes well known to industry.

The exhaust gas after removal of the moisture in the moisture separator 25 passes into a heat interchanger 28. This heat interchanger may be any one of several types in common use or it may comprise several units of the same type or of different types. For the purposes of illustration we have indicated a familiar type of heat interchanger; namely, a cylindrical shell closed at the ends and provided at each end with a tube sheet 29 forming a liquid space 32 at each end. The liquid spaces 32 are connected by tubes 33 which penetrate the tube sheets 29. The cold gas flows in the space within the shell between the tubes 33. A baffle 34 is provided to direct the flow of gas among the tubes and thereby to obtain a high rate of heat transfer from the tubes to the gas. A refrigerating medium such as brine is conveyed by a pipe 35 into the liquid space 32 at one end of the heat interchanger and flows thence through the tubes 33 to the liquid space 32 at the other end of the heat interchanger. In passing through the tubes the refrigerating medium loses heat through the tube walls to the cold gas which is circulating outside of the tubes and the circulating medium is thereby chilled. The cold circulating medium is then removed from the heat interchanger by a pipe 36 and is conveyed to the point at which a refrigerating effect is desired. For example, the cold brine may be used for freezing ice or for any other refrigerating process. In the performance of this refrigerating process the brine will absorb heat from the substance which is being refrigerated and the warm brine is then returned by the pipe 35 to the heat interchanger to be recooled as already described.

After flowing among the tubes 33 and absorbing heat from them the gas leaves the heat interchanger 28 by a pipe 40 and is thereby conveyed to a brine cooler 41 containing a pipe coil 42 and thence by a pipe 43 to the low pressure distribution system for use as a fuel or for any other purposes for which it is suitable. The pipe coil 42 is connected to the pipe coil 3 in the gas precooler 2 and brine is caused to circulate in this system by the pump 6. As the gas in the brine cooler 41 is still cold it absorbs heat from the brine in the pipe coil 42 which in turn absorbs heat from the high pressure gas in the gas precooler 2.

In some cases it may be desirable to install the brine cooler 41 between the moisture separator 25 and the heat interchanger 28 thereby utilizing the lowest temperature available for precooling the gas, or in some gases the precooling equipment may be omitted entirely. This would eliminate the precooling chamber 2, brine cooler 41, pipe coils 3 and 42 and pump 6. Moisture separator 8 might also be omitted if the gas available contained no precipitated moisture. The considerations determining the use and amount of precooling desirable have been outlined above.

While the method herein described, and the form of apparatus for carrying this method into effect, constitute preferred embodiments of the invention, it is to be understood that the invention is not limited to this precise method and form of apparatus and that changes may be made in either without departing from the scope of the invention which is defined in the appended claim.

We claim:

The method of treating a moisture containing gas, which comprises admixing with the gas a substance adapted to lower the freezing point of the moisture, expanding the gas to a lower pressure whereby the gas is chilled to at least the freezing point of water and the moisture is precipitated in sufficient admixture with the substance to maintain the moisture in liquid form, warming the chilled gas by contact with a substance to be refrigerated, and initially cooling the moisture containing gas by means of the warmed chilled gas to preliminarily precipitate a portion of the moisture.

RALPH D. BOOTH.
JOHN R. COFFIN.
ALEXANDER J. TIGGES.